United States Patent
Fukutomi et al.

(10) Patent No.: US 6,663,775 B2
(45) Date of Patent: *Dec. 16, 2003

(54) CHARGE MOSAIC MEMBRANE, ITS PRODUCTION PROCESS, METHOD OF ITS USE, AND APPARATUS PROVIDED WITH THE SAME

(75) Inventors: Takashi Fukutomi, Nangoku (JP); Yoshifumi Sugito, Tokyo (JP); Minoru Takizawa, Tokyo (JP); Naomi Oguma, Tokyo (JP); Seiji Doi, Tokyo (JP); Michiei Nakamura, Tokyo (JP)

(73) Assignee: Dainichiseika Color & Chemicals Mfg. Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 213 days.

(21) Appl. No.: 09/255,017

(22) Filed: Feb. 22, 1999

(65) Prior Publication Data

US 2003/0192828 A1 Oct. 16, 2003

(30) Foreign Application Priority Data

Feb. 25, 1998 (JP) .......................... 10-043468
Jun. 18, 1998 (JP) .......................... 10-171006
Aug. 24, 1998 (JP) .......................... 10-237708

(51) Int. Cl.$^7$ .......................... B01D 39/00; B01D 39/14

(52) U.S. Cl. ........................ 210/502.1; 210/500.27; 210/500.21; 210/500.35; 210/500.36; 210/321.6; 521/27; 521/29

(58) Field of Search .................. 210/321.6, 500.27, 210/502.1, 500.21, 500.38, 500.39, 500.41, 500.36, 500.35; 521/27, 28, 29; 204/296, 632

(56) References Cited

U.S. PATENT DOCUMENTS

| | | | |
|---|---|---|---|
| 3,446,726 A | * | 5/1969 | Pungor et al. ............ 521/27 X |
| 3,541,030 A | * | 11/1970 | Boles |
| 4,067,803 A | | 1/1978 | Quentin |
| 4,191,811 A | * | 3/1980 | Hodgdon |
| 4,615,786 A | * | 10/1986 | Culkin et al. |
| 4,976,860 A | * | 12/1990 | Takahashi et al. |

(List continued on next page.)

FOREIGN PATENT DOCUMENTS

| | | | |
|---|---|---|---|
| EP | 589133 | * | 3/1994 |
| EP | 760249 | * | 3/1997 |
| GB | 1197357 | * | 7/1970 |
| WO | 96/22162 | * | 7/1996 |

OTHER PUBLICATIONS

John N. Weistein et al, Transport Properties of charged–Mosaic Membranes; Desalination, The International Journal on the Science and Technology of water Desalting, Vol 12 1973.*

*Primary Examiner*—Ana Fortuna
(74) *Attorney, Agent, or Firm*—Oblon, Spivak, McClelland, Maier & Neustadt, P.C.

(57) ABSTRACT

A charge mosaic membrane having excellent selective permeability comprises a cationic polymer component, an anionic polymer component and a matrix component. Both of the cationic polymer component and the anionic polymer component are crosslinked particulate polymers. The matrix component is at least one polymer selected from a polysulfone resin, a polyarylate resin, a polyamide resin, a polyimide resin, a polyamideimide resin, a polyurethane resin, a fluorinated resin or a silicone resin. The charge mosaic membrane can be easily produced by conducting formation of the membrane by using a composition in which the cationic polymer component and the anionic polymer component are both dispersed in a solution of the matrix component in an organic solvent.

14 Claims, 2 Drawing Sheets

U.S. PATENT DOCUMENTS

| | | | |
|---|---|---|---|
| 5,017,420 A | * | 5/1991 | Marikar et al. |
| 5,127,925 A | * | 7/1992 | Kulprathipanja et al. |
| 5,304,307 A | * | 4/1994 | Linder et al. |
| 5,346,924 A | * | 9/1994 | Giuffrida .................... 521/28 |
| 5,401,784 A | * | 3/1995 | Boillot et al. |
| 5,543,045 A | | 8/1996 | Fukutomi et al. |
| 5,714,521 A | * | 2/1998 | Kedem et al. |
| 5,770,631 A | | 6/1998 | Fukutomi et al. |

* cited by examiner

FIG.2

CHARGE MOSAIC MEMBRANE, ITS PRODUCTION PROCESS, METHOD OF ITS USE, AND APPARATUS PROVIDED WITH THE SAME

BACKGROUND OF THE INVENTION a) Field of the Invention

This invention relates to a charge mosaic membrane permitting permeation of an electrolyte therethrough, a process for the production of the charge mosaic membrane, a method of use of the charge mosaic membrane, and an apparatus provided with the charge mosaic membrane.

b) Description of the Related Art

Charge mosaic membranes through each of which cationic polymer domains and anionic polymer domains extend in a substantially alternating arrangement relative to the direction of the thickness of the membrane are known to date. These known membranes have a function that they can dialyze electrolytes of low molecular weights but they cannot dialyze nonelectrolytes or have very low dialysis rates for such nonelectrolytes.

As a process for the production of such a charge mosaic membrane, it has been proposed to use a block copolymer or to use at least one of a cationic polymer and an anionic polymer in the form of fine polymer particles. The production process making use of the block copolymer is very difficult to practice. In contrast, the production process in which at least one of the cationic polymer and the anionic polymer is used in the form of fine polymer particles has a merit in that the production is very easy.

In the above-described process making use of fine polymer particles, use of the fine polymer particles in the form of microspheres makes it possible to rather easily produce a charge mosaic membrane owing to the inherent close packability and isotropy of the microspheres. Nonetheless, this process is accompanied by a problem for the production of a membrane of large area, because most components of the membrane are ionic polymers and the membrane so formed tends to shrink or lose strength upon drying.

As a process which reduces the above problem, a process making use of a pliable polymer component as a matrix component for a charge mosaic membrane is proposed in JP kokai No. 10-87855. This process has facilitated the production of a charge mosaic membrane of large area while providing the charge mosaic membrane with improved durability and handling during use. However, this process requires long time for the formation of the membrane, is not fully satisfactory in the stability of a mixture or dispersion of a cationic polymer component and an anionic polymer component (both of the polymer components may hereinafter be called "charged polymer components"), and furthermore, has difficulty in producing a thin membrane having a uniform thickness.

SUMMARY OF THE INVENTION

An object of the present invention is therefore to provide a charge mosaic membrane making use of charged polymer particles, which can be produced with ease and has excellent selective permeability, and also a process for the production of a charge mosaic membrane having a uniform and small thickness, which requires short time for the formation of the membrane and is excellent in the stability of a mixture or dispersion of the charged polymer components and a matrix component.

To achieve the above-described object, the present invention therefore provides: in an aspect thereof, a charge mosaic membrane comprising a cationic polymer component, an anionic polymer component and a matrix component, wherein both of the cationic polymer component and the anionic polymer component are crosslinked particulate polymers; and the matrix component is at least one polymer selected from a polysulfone resin, a polyarylate resin, a polyamide resin, a polyimide resin, a polyamideimide resin, a polyurethane resin, a fluorinated resin or a silicone resin; in any other aspect thereof, a process for the production of the charge mosaic membrane, which comprises conducting formation of the membrane by using a composition in which the cationic polymer component and the anionic polymer component are both dispersed in a solution of the matrix component in an organic solvent; in a further aspect thereof, a method of use of the charge mosaic membrane, which comprises using the membrane for permeation of an electrolyte; and in a still further aspect thereof, an apparatus provided with the charge mosaic membrane.

The charge mosaic membrane according to the present invention is excellent in physical properties such as chemical resistance, solvent resistance and waterproofness, is chemically stable, has durability against hydrolysis and oxidative degradation, and possesses superb selective permeability.

According to the production process of the present invention, the domain-forming, charged polymer components are both used in the form of the crosslinked particulate polymers, and at least one polymer selected from the polysulfone resin, the polyarylate resin, the polyamide resin, the polyimide resin, the polyamideimide resin, the polyurethane resin, the fluorinated resin or the silicone resin is used as the matrix forming polymer component. Upon formation of the membrane, the crosslinked particulate polymers as the charged polymer components are used in the form of the composition in which the crosslinked particulate polymers are dispersed in the solution of the matrix component in the organic solvent. This production process can therefore form a thin charge mosaic membrane having a uniform thickness in a short membrane-forming time while enjoying excellent stability of the mixture, i.e., dispersion of the charged polymer components and the matrix component.

Therefore, the charge mosaic membrane according to the present invention can be used for the selective permeation of an electrolyte, for example, for the transport, separation, concentration, absorption or the like of an electrolyte.

DETAILED DESCRIPTION OF THE INVENTION AND PREFERRED EMBODIMENTS

The charge mosaic membrane according to the present invention is characterized in that the cationic and anionic polymer components (which may hereinafter be called the "charged polymer components"), said charged polymer components forming domains of the membrane, are the crosslinked particulate polymers, respectively, and that its matrix component is composed of at least one polymer selected from the polysulfone resin, the polyarylate resin, the polyamide resin, the polyimide resin, the polyamideimide resin, the polyurethane resin, the fluorinated resin or the silicone resin.

The production process of the charge mosaic membrane is characterized in that the membrane is formed using both of the charged polymer components in the form of the composition in which they are dispersed in the solution of at least one polymer—which is selected as the matrix component from the polysulfone resin, the polyarylate resin, the polyamide resin, the polyimide resin, the polyamideimide resin, the polyurethane resin, the fluorinated resin or the silicone resin—in the organic solvent. Incidentally, the preferred average particle size of each of the charged polymer components which make up the charge mosaic membrane in the present invention may be in a range of from 0.01 to 20 $\mu$m, preferably in a range of from 0.02 to 10 $\mu$m.

Examples of charged polymer components usable in the present invention can include, as cationic polymer components, polymers containing cationic groups such as primary to tertiary amino groups, quaternary ammonium groups or pyridinium groups or groups of salts thereof and as anionic polymer components, polymers containing anionic groups such as sulfonic groups, carboxylic groups, sulfate ester groups or phosphate ester groups or groups of salts thereof.

Upon converting ionic groups into groups of salts thereof, an acid, for example, hydrochloric acid, sulfuric acid, phosphoric acid or an organic acid can be used for cationic groups, while a base, for example, an alkali metal, ammonia, an amine or an alkanolamine can be used for anionic groups.

The charged polymer components may each be prepared by forming an uncharged particulate polymer and then subjecting the uncharged particulate polymer to chemical modification such as amination, quaternary ammoniation, hydrolysis, sulfonation or sulfation. Chemical modifications other than the above-exemplified ones can also be employed provided that uncharged polymers can be cationized or anionized by the chemical modifications.

Typical examples of monomers usable for the preparation of the charge polymer components can include anionic monomers such as (meth)acrylic acid, styrene-sulfonic acid, (meth)acryloyloxypropylsulfonic acid, sulfopropyl(meth)acrylate, 2-sulfoethyl(meth)acrylate, 2-(meth) acryloylamino-2-methyl-1-propanesulfonic acid, 2-(meth) acryloylamino-2-propanesulfonic acid and vinylsulfonic acid, and salts thereof; 4-vinylpyridine and 2-vinylpyridine, and quaternized derivatives thereof; and cationic monomers such as dimethylaminoethyl(meth)acrylate, diethylaminoethyl(meth)acrylate, 4-vinylbenzyldimethylamine and 2-hydroxy-3-(meth)acryloxypropyldimethylamine, and quaternized derivatives and salts thereof.

On the other hand, representative examples of monomers usable for the production of uncharged polymers, which are to be converted into charged polymer components by chemical modifications, can include chemically modifiable monomers, for example, styrene compounds such as styrene, α-methylstyrene, chloromethylstyrene and hydroxymethylstyrene; (meth)acrylate ester compounds such as methyl (meth)acrylate, ethyl(meth)acrylate, hydroxyethyl(meth) acrylate, polyethylene glycol(meth)acrylate, hydroxypropyl (meth)acrylate and polypropylene glycol(meth)acrylate; (meth)acrylamide compounds such as (meth)acrylamide, N-methyl(meth)acrylamide, N-methylol(meth)acrylamide, N-butoxymethyl(meth)acrylamide and N,N-dimethylacrylamide; acrylonitrile; and vinyl acetate.

Chemically-modifiable, uncharged polymers can each be obtained by polymerizing the above-described monomer. Upon polymerization, this monomer may be copolymerized with a known uncharged monomer which remains substantially unchanged by such a chemically-modifying reaction. Illustrative of such a monomer are lauryl(meth)acrylate and stearyl(meth)acrylate.

Charged or uncharged particulate polymers which are produced using the above-described charged or chemically-modifiable monomers are required to be in crosslinked forms because an organic solvent is used upon forming them into membranes. Crosslinking of each particulate polymer is generally achieved by co-polymerizing a crosslinking monomer upon polymerization of the above-described charged or uncharged polymer or the like.

Illustrative of the crosslinking monomer are bifunctional monomers such as divinylbenzene, methylene bis(meth) acrylamide, ethylene glycol dimethacrylate and 1,3-butylene glycol dimethacrylate; trifunctional monomers such as trimethylolpropane trimethacrylate; and tetrafunctional(meth) acrylates. These crosslinking monomer can be used preferably in a range of from 0.1 to 30 parts by weight, more preferably in a range of from 0.5 to 10 parts by weight per 100 parts by weight of the monomers making up the polymer.

As a representative process for the production of the particulate polymer components from such monomers and crosslinking monomers, radical polymerization in an aqueous system or non-aqueous system can be mentioned. Illustrative methods of the polymerization can include, but are not limited to, polymerization methods such as emulsion polymerization, soap-free polymerization, suspension polymerization, dispersion polymerization, and reversed-phase emulsion polymerization.

As a polymerization initiator, conventionally-known polymerization initiators useful in radical polymerization are all usable. Illustrative are azo compounds such as 2,2'-azoisobutyronitrile, 2,2'-azobis(methylisobutyrate), 2,2'-azobis(2,4-dimethylvaleronitrile), 1,1'-azobis (cyclohexane-1-carbonitrile), 2,2'-azobis(2-amidinopropane)dihydrochloride, 2,2'-azobis(2-amidinopropane)diacetate and 2,2'-azobis(N,N'-dimethyleneisobutylamidine)dihydrochloride, organic peroxides such as cumene hydroperoxide, dicumyl peroxide, benzoyl peroxide and lauryl peroxide; and persulfates such as ammonium persulfate and potassium persulfate.

In the present invention, the matrix component which forms the charge mosaic membrane may preferably be at least one polymer selected from a polysulfone resin, a polyacrylate resin, a polyamide resin, a polyimide resin, a polyamideimide resin, a polyurethane resin, a fluorinated resin or a silicone resin. These resins have property permitting formation of a membrane by heated drying or the like upon formation of the charge mosaic membrane. The resulting resin matrix is excellent in physical properties such a chemical resistance, solvent resistance and waterproofness, is chemically stable, and has superb durability against hydrolysis and oxidative degradation. The above-selected polymer is therefore the most preferable matrix component for the object of the present invention.

A polysulfone resin is a condensation polymer containing sulfonyl groups (—$SO_2$— groups) in its molecule. Specific examples can include polysulfone resins, such as polysulfone resins of the below-described formula (1), polyether sulfone resins of the below-described formula (2) and polyphenylsulfone resins of the below-described formula (3); and sulfonated products thereof.

A polyacrylate resin is a condensation polymer containing ester groups in its molecule. Specific examples can include those of the below-described formulas (4)–(6).

A polyamide resin is a condensation polymer containing amido groups in its molecule. Specific examples can include those of the below-described formula (7).

A polyamideimide resin is a polymer which contains both amido groups and imide groups in its molecule. Specific examples can include those of the below-described formulas (8) and (9).

A polyimide resin is a condensation polymer containing imido groups in its molecule. Specific examples can include those of the below-described formulas (10) and (11). They also include polyether imide resins.

A polyurethane resin is a polymer containing urethane groups in its molecule. Specific examples can include those of the below-described formulas (12) and (13). They also include polyurethaneurea resins.

A fluorinated resin is a polymer composed of carbon, hydrogen and fluorine. Specific examples can include those of the below-described formulas (14) and (15). They also include sulfonated products of fluorine resins. Specific examples can includes those of the below-described formula (16).

A silicone resin is a polymer containing siloxane bonds (Si—O—Si) in its molecule. Specific examples can include those of the below-described formula (17).

-continued (10)

(11)

(12)

(13)

(14)

(15)

(16)

(17)

In the above-described formulas, m and n stand for values large enough to provide their corresponding resins with molecular weights of from abut 1,000 to 500,000.

The above resins can be used either singly or in combination. To impart pliability to the resulting charge mosaic membrane, a butadine resin, an ethylenevinyl acetate resin or the like may also be added to the membrane-forming composition.

The process of the present invention for the production of the charge mosaic membrane is characterized in that the charged polymer components are both used in the form of crosslinked particulate polymers and that the membrane is formed using the particulate polymers in the form of the composition in which the particulate polymers are dispersed in the solution of at least one polymer—which is selected as a matrix component from the polysulfone resin, the polyacrylate resin, the polyamide resin, the polyimide resin, the polyamideimide resin, the polyurethane resin, the fluorinated resin or the silicone resin—in the organic solvent.

Firstly, a coating formulation is prepared by mixing the charged polymer components and the solution of the matrix component in the organic solvent so that the charged polymer components are dispersed in the solution. Upon mixing the charged polymer components, they are used preferably in a form dispersed in the organic solvent. Although no particular limitation is imposed on a method for mixing and dispersing the charged polymer components in the solution of the matrix component in the organic solvent, the mixing and dispersion can be conducted, for example, by ultrasonic agitation, in a dissolver or homomixer, or by a stirrer.

Concerning the proportions of the domain-forming, charged polymer components and the matrix component in the charge mosaic membrane according to the present invention, the matrix component may amount preferably to 2 to 95 wt. %, more preferably to 10 to 80 wt. % of a sum of all the components.

The organic solvent employed in the present invention is an organic solvent which can dissolve the matrix component. Illustrative are nitrogen-containing solvents such as N-methyl-2-pyrrolidone, N-ethyl-2-pyrrolidone, N-vinyl-2-pyrrolidone, N,N-dimethylformamide, N,N-diethylformamide, N,N-dimethylacetamide, and N,N-diethylacetamide; ether solvents such as dioxane and tetrahydrofuran; ketone solvents such as methyl ethyl ketone and methyl isobutyl ketone; dimethylsulfoxide; propylene glycol monomethyl ether; isopropyl alcohol; propylene glycol monomethyl ether acetate; xylene; dichloroethylene; chloroform; and cyclohexane.

Upon mixing the charged polymer components and the matrix component in such an organic solvent, it is preferable to use the charged polymer components in a form dispersed in the organic solvent. A nitrogen-containing solvent is therefore preferred for its excellent dispersibility of the charged polymer components and the superb stability of the resulting dispersion. Other organic solvents or water-base solvents may also be used in combination insofar as the resulting dispersion system does not become unstable.

Next, the coating formulation obtained as described above is coated or cast onto a base material without using any coating means or by using a known coating method or is applied onto a support by coating, impregnation or casting. The thus-coated coating formutation is then dried to eliminate the solvent, so that a charge mosaic membrane is formed. Subsequent to the drying, the resultant membrane may be subjected to treatment such as heat fusing treatment, heat pressing treatment or quaternization as needed, whereby a charge mosaic membrane is obtained.

Illustrative base materials usable in the present invention can include glass plates, aluminum sheets and plates, sheets, films or formed plates of plastics such as TEFLON (trade mark), polypropylene and polyethylene, and mold release paper coated with silicone resin or polypropylene resin.

On the other hand, illustrative supports usable in the present invention can include woven fabrics, nonwoven fabrics, mesh-like materials, paper, filter paper and the like, hollow yarns, and porous materials. Examples of materials of these supports can include stainless steel, aluminum, ceramics, polyesters, nylon, polyamides, polycarbonates, polypropylene, polyethylene, cellulose, chitin, TEFLON, polyurethanes, and polysulfones.

Illustrative methods for coating the base material or support with the coating formulation can include conventionally-known coating methods such as roll coating, blade coating, knife coating, squeegee coating, air doctor coating, gravure coating, rod coating, spray coating, impregnation, and incorporation.

The coating formulation coated by the above-described method is dried, for example, in a drum drier or a forced air drier or under infrared ray lumps, whereby a charge mosaic membrane according to the present invention is formed. The membrane so formed has a thickness preferably in a range of from 0.1 to 1,000 $\mu$m, more preferably in a range of from 0.5 to 200 $\mu$m.

Incidentally, the charge mosaic membrane of the present invention produced as described above can be formed into a flat membrane, a spiral shape, a cylindrical shape, a corrugated shape, a hollow yarn shape or the like. It is however to be noted that no particular limitation is imposed on the shape of the membrane.

The charge mosaic membrane according to the present invention has a structure such that the domains of the cationic polymer component and those of the anionic polymer component are arranged substantially in an alternating order relative to the thicknesswise direction of the membrane and as a whole, extend through the membrane; and has a function such that electrolytes of low molecular weights are allowed to permeate therethrough but nonelectrolytes are prevented from permeating therethrough or are allowed to permeate only at very low permeation rates therethrough.

Accordingly, the charge mosaic membrane according to the present invention can be used for the selective permeation of electrolytes. For example, the charge mosaic membrane according to the present invention is useful for the desalting of electrolytes of low molecular weights such as sodium chloride, potassium chloride, sodium sulfate, sodium phosphate and calcium chloride and also for the deionization of hydrochloric acid, acetic acid and sodium hydroxide. Specifically, the charge mosaic membrane according to the present invention is useful for desalting in water treatment for the production of drink water, industrial water, purified water, ultrapure water and the like; desalting of industrial effluents from chemical industry and metal industry; desalting of dyes and pigments in color production industry; desalting of biochemistry-related products in fermentation industry and food industry; desalting of pharmaceutical products; and adsorption of dyes as recording media.

In particular, the charge mosaic membrane according to the present invention is useful in fields where electrodialysis has heretofore been unapplicable for denaturation of target substances due to evolution of heat, membrane contamination due to ionic adsorption, or a like reason, for example, for the desalting of proteins, DNAs and the like and the desalting of dyes, pigments, surfactants and the like.

Owing to such a membrane structure as described above, the charge mosaic membrane according to the present invention is also useful as a diaphragm or the like in electrodialysis, diffuse dialysis, electrolysis, a cell reaction or the like which makes use of a membrane property such as electrical conductivity or ion permeability.

The present invention will next be described more specifically by synthesis examples and examples, in which the designations of "part" or "parts" and "%" are by weight basis unless otherwise specifically indicated.

SYNTHESIS EXAMPLE 1

Polymer A: Crosslinked Cationic Particulate Polymer

| | |
|---|---|
| 4-Vinylpyridine | 20.0 parts |
| Divinylbenzene | 2.0 parts |
| 2,2'-Azobis(2-amidinopropane) dihydrochloride | 0.4 part |
| Water | 1,000 parts |

The above components were charged in a flask and under a nitrogen gas stream, were polymerized at 80° C. for 8 hours. The resulting polymerization product was lyophilized, whereby a particulate polymer was obtained with its inside crosslinked. As a result of a measurement under a scanning electron microscope, the average particle size of the particulate polymer was found to be about 350 nm.

SYNTHESIS EXAMPLE 2

Polymer B: Crosslinked Cationic Particulate Polymer

Particles of Polymer A, poly(4-vinylpyridine), were dispersed in methyl alcohol, to which methyl iodide was added. The resulting mixture was stirred for 12 hours, followed by salt interchange with hydrochloric acid. The thus-obtained product was thoroughly washed with water, whereby a quaternized product of the poly(4-vinylpyridine) was obtained.

Subsequent to lyophilization, a crosslinked particulate polymer was obtained. The average particle size of the crosslinked particulate polymer was about 360 nm.

SYNTHESIS EXAMPLE 3

Polymer C: Crosslinked Cationic Particulate Polymer

| | |
|---|---|
| Chloromethylstyrene | 200.0 parts |
| Divinylbenzene | 10.0 parts |
| Potassium persulfate | 4.0 parts |
| Sodium thiosulfate | 4.0 parts |
| Sodium lauryl sulfate | 40.0 parts |
| Water | 1,000 parts |

The above components were charged in a flask and under a nitrogen gas stream, were polymerized at 50° C. for 12 hours. The resulting particulate polymer was collected, and was then thoroughly washed with warm water and methyl alcohol to remove the surfactant from the surfaces of the crosslinked particulate polymer. The crosslinked particulate polymer was dispersed in water, so that a dispersion was prepared. Triethylamine was added to the dispersion, followed by stirring for 12 hours. The resulting product was then lyophilized, whereby the quaternary ammonium salt of the crosslinked particulate polymer was obtained. Its average particle size was about 150 nm.

SYNTHESIS EXAMPLE 4

Polymer D: Crosslinked Anionic Particulate Polymer

| | |
|---|---|
| Styrene | 41.6 parts |
| Acrylonitrile | 7.1 parts |
| Hydroxyethyl methacrylate | 8.1 parts |
| Divinylbenzene | 8.7 parts |
| Potassium persulfate | 0.5 part |
| Water | 1,000 parts |

The above components were charged in a flask and under a nitrogen gas stream, were polymerized at 80° C. for 8 hours. The average particle size of the resulting particulate polymer was about 180 $\mu$m. The crosslinked particulate polymer was collected by filtration, dried and then ground. Subsequently, 100 parts of the crosslinked particulate polymer so ground were added little by little into 650 parts of 98% concentrated sulfuric acid, followed by stirring at 50° C. for 24 hours and then at 80° C. for 3 hours. The reaction mixture was allowed to cool down and was then poured into a large quantity of ice water. Subsequent to neutralization with sodium carbonate, the thus-treated, crosslinked particulate polymer was collected by filtration and then thoroughly washed with water.

As a result of an analysis by infrared absorption spectroscopy, ion chromatography and the like, the thus-obtained, crosslinked particulate polymer was confirmed to contain sulfonic groups introduced at a rate of about 1 group per aromatic ring. The average particle size of the crosslinked particulate polymer was about 240 nm.

SYNTHESIS EXAMPLE 5

Polymer E: Crosslinked Anionic Particulate Polymer

| | |
|---|---|
| Sodium styrenesulfonate | 20.0 parts |
| Styrene | 10.0 parts |
| Butyl acrylate | 5.0 parts |
| Acrylamide | 2.8 parts |
| Divinylbenzene | 1.8 parts |
| 2,2'-Azobis(2-amidinopropane) dihydrochloride | 1.0 part |
| Water | 1,000 parts |

The above components were charged in a flask and under a nitrogen gas stream, were polymerized at 75° C. for 10 hours. The crosslinked particulate polymer so obtained was purified by reprecipitation from acetone-water. The average particle size of the resulting crosslinked particulate polymer was about 100 nm.

EXAMPLE 1

Polymer A (3.6 parts) was dispersed in N-methyl-2-pyrrolidone (8.5 parts). The dispersion and 60 parts of a 20% N-methyl-2-pyrrolidone solution of a polysulfone (product of Amoco Chemical Corp., molecular weight: 30,000) were stirred for 1 hour. The resulting dispersion was mixed with another dispersion consisting of 8.4 parts of Polymer D and 19.5 parts of N-methyl-2-pyrrolidone, whereby a coating formulation was prepared.

The coating formulation was coated by a knife coater on a sheet of mold release paper coated with polypropylene resin and was then dried with hot air. The thus-obtained membrane was left over at room temperature for 12 hours in a methyl iodide atmosphere, washed with water and then dried in air, whereby a charge mosaic membrane according to the present invention was obtained.

The charge mosaic membrane formed as described above had a uniform thickness of about 30 $\mu$m.

Evaluation of Membrane

Figure 1:
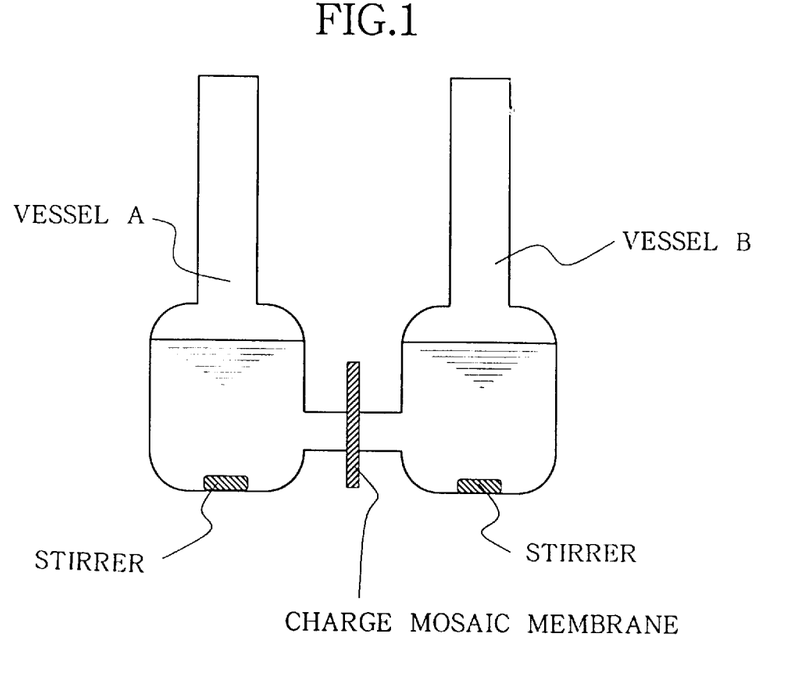
FIG. 1 is a schematic vertical cross-sectional view of a dialyzer as one example of an apparatus making use of a charge mosaic membrane according to the present invention.
Figure 2:
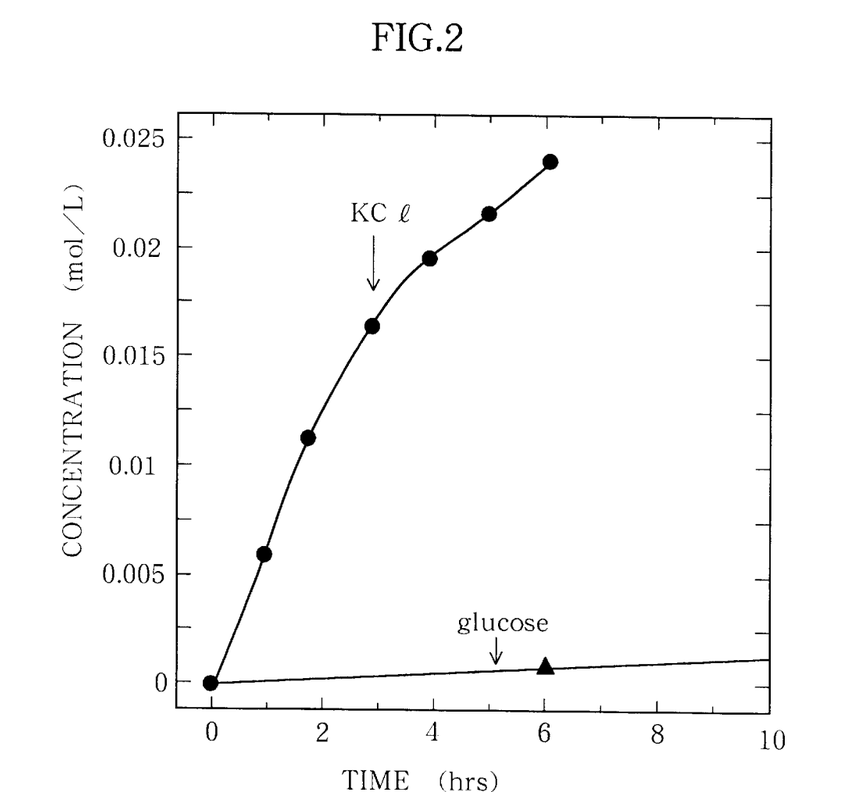
FIG. 2 is a graph showing dialytic separation performance of a charge mosaic membrane of Example 1.

Placed in a container A shown in FIG. 1 were 100 ml of a 0.1 mol/l aqueous solution of potassium chloride as an electrolyte and 100 ml of a 0.1 mol/l aqueous solution of glucose as a nonelectrolyte. On the other hand, deionized water (200 ml) was placed in a container B in the same drawing. While stirring the contents of the containers A,B by stirrers 1,1, respectively, dialysis was then conducted through the above charge mosaic membrane at 25° C. under environmental pressure. As is shown in FIG. 2, sufficient dialytic separation performance was demonstrated.

EXAMPLE 2

Polymer A (2.0 parts) was dispersed in 8.0 parts of N-methyl-2-pyrrolidone. The dispersion and 66.7 parts of a 10% N-methyl-2-pyrrolidone solution of a polyarylate ("U-100", trade name; product of Unichika, Ltd.) were stirred for 1 hour. The resulting dispersion was mixed with another dispersion consisting of 4.7 parts of Polymer D and 18.7 parts of N-methyl-2-pyrrolidone, whereby a coating formulation was prepared. The coating formulation was coated by a knife coater on a sheet of mold release paper coated with polypropylene resin and was then dried with hot air. The thus-obtained membrane was left over at room temperature for 12 hours in a methyl iodide atmosphere, washed with water and then dried in air, whereby a charge mosaic membrane according to the present invention was obtained. The charge mosaic membrane formed as described above had a uniform thickness of about 50 μm.

Further, its dialytic separation performance on an electrolyte was evaluated in a similar manner as in Example 1. The results were substantially comparable with the dialytic separation performance achieved in Example 1.

EXAMPLE 3

Polymer B (3.6 parts) was stirred for 2 hours in 90.9 parts of a 10% N-methyl-2-pyrrolidone solution of a polyamide resin to disperse Polymer B in the solution. In the resulting dispersion, Polymer D (5.5 parts) was mixed and dispersed further, whereby a coating formulation was prepared. The coating formulation was coated by a knife coater on a glass plate and was then dried with hot air. The glass plate with a membrane so formed thereon was immersed in water. The membrane was removed from the glass plate and was then dried in air, whereby a charge mosaic membrane according to the present invention was obtained. The charge mosaic membrane formed as described above had a uniform thickness of about 50 μm.

Further, its dialytic separation performance on an electrolyte was evaluated in a similar manner as in Example 1. The results were substantially comparable with the dialytic separation performance achieved in Example 1.

EXAMPLE 4

Polymer C (4.6 parts) was dispersed in N,N-dimethylformamide (25.8 parts). The dispersion and 37.6 parts of a 29% N,N-dimethylformamide solution of a polyurethane ("Leathamine", trade mark; product of Dainichiseika Color & Chemicals Mfg. Co., Ltd.) were stirred for 1 hour. The resulting dispersion was mixed with another dispersion consisting of 6.4 parts of Polymer E and 25.5 parts of N,N-dimethylformamide, whereby a coating formulation was prepared. The coating formulation was coated by a knife coater on a sheet of mold release paper coated with polypropylene resin. Further, a nonwoven polyester fabric was brought into close contact with the coated surface, followed by drying with hot air. A charge mosaic membrane according to the present invention was hence obtained. The dialytic separation performance of the charge mosaic membrane obtained as described above and equipped with the nonwoven polyester fabric as a support was evaluated in a similar manner as in Example 1. The results were substantially comparable with the dialytic separation performance achieved in Example 1, and the durability and handling of the charge mosaic membrane were good during the use.

EXAMPLE 5

Polymer A (3.0 parts) was dispersed in 12.0 parts of N-dimethylformamide. The dispersion and 50 parts of a 20 wt. % N,N-dimethylformamide solution of a matrix component, which consisted of a polysulfone and a polyether-type polyurethane [=4/1 (nonvolatile weight ratio)], were stirred for 1 hour. The resulting dispersion was mixed with another dispersion consisting of 7.0 parts of Polymer D and 28.0 parts of N,N-dimethylformamide, whereby a coating formulation was prepared. The coating formulation was coated by a knife coater on a sheet of mold release paper coated with polypropylene resin and was then dried with hot air. The thus-obtained membrane was left over at room temperature for 12 hours in a methyl iodide atmosphere, washed with water and then dried in air, whereby a charge mosaic membrane according to the present invention was obtained. The charge mosaic membrane formed as described above had a uniform thickness of about 30 μm, and had more pliability compared with the charge mosaic membrane of Example 1.

Further, its dialytic separation performance on an electrolyte was evaluated in a similar manner as in Example 1. The results were substantially comparable with the dialytic separation performance achieved in

EXAMPLE 1.

This application claims the priority of Japanese Patent Application No. HEI 10-43468 filed Feb. 25, 1998, which is incorporated herein by reference.

What is claimed is:

1. A charge mosaic membrane comprising a cationic polymer component, an anionic polymer component and a matrix component, wherein both of said cationic polymer component and said anionic polymer component are crosslinked particulate polymers; and said matrix component is at least one polymer selected from the group consisting of a polyarylate resin, and a fluorinated resin, wherein said charge mosaic membrane is in a form that allows electrolytes to permeate therethrough, wherein said cationic polymer component and said anionic polymer component have average particle sizes in a range of from 0.01 to 20 μm, and wherein said charge mosaic membrane contains no support substrate.

2. The charge mosaic membrane according to claim 1, wherein said cationic polymer component is a polymer having primary to tertiary amino groups, quaternary ammonium groups or pyridinium groups, or groups of salts thereof; and said anionic polymer component is a polymer having sulfonic groups, carboxylic groups, sulfate ester groups or phosphate ester groups, or groups of salts thereof.

3. The charge mosaic membrane according to claim 1, wherein said matrix component amounts to 2 to 95 wt. % of a sum of said cationic polymer component and anionic polymer component, which make up domains in said charge mosaic membrane, and said matrix component.

4. The charge mosaic membrane according to claim 1, wherein said charge mosaic membrane has a thickness in a range of from 0.1 to 1,000 μm.

5. The method of use of the charge mosaic membrane according to claim 1, which comprises using said membrane for permeation of an electrolyte.

6. An apparatus provided with the charge mosaic membrane according to claim 1.

7. The charge mosaic membrane according to claim 1, wherein the matrix component is a polyarylate resin.

8. The charge mosaic membrane according to claim 1, wherein the matrix component is a fluorinated resin.

9. A process for producing a charge mosaic membrane comprising a cationic polymer component, an anionic polymer component and a matrix component, wherein both of said cationic polymer component and said anionic polymer component are crosslinked particulate polymers; and said matrix component is at least one polymer selected from the group consisting of a polyarylate resin, and a fluorinated resin, wherein said charge mosaic membrane is in a form that allows electrolytes to permeate therethrough, said process comprising dispersing said cationic polymer component and said anionic polymer component, each in crosslinked particulate form, in a solution of said matrix component in an organic solvent, to form a dispersion, followed by applying said dispersion to a support, followed by drying said dispersion to eliminate the solvent therefrom to form said charge mosaic membrane, and removing said charge mosaic membrane from said support.

10. The process according to claim 9, wherein said cationic polymer component is a polymer having primary to tertiary amino groups, quaternary ammonium groups or pyridinium groups, or groups of salts thereof; and said anionic polymer component is a polymer having sulfonic groups, carboxylic groups, sulfate ester groups or phosphate ester groups, or groups of salts thereof.

11. The process according to claim 9, wherein said matrix component amounts to 2 to 95 wt. % of a sum of said cationic polymer component and anionic polymer component, which make up domains in said charge mosaic membrane, and said matrix component.

12. The process according to claim 9, wherein said charge mosaic membrane has a thickness in a range of from 0.1 to 1,000 µm.

13. The process according to claim 9, wherein said matrix component is a polyarylate resin.

14. The process according to claim 9, wherein said matrix component is a fluorinated resin.

* * * * *